United States Patent [19]

Hansen

[11] Patent Number: 4,585,190

[45] Date of Patent: Apr. 29, 1986

[54] WATER ACTIVATED PRESSURIZED GAS APPARATUS FOR RESCUE APPLICATIONS

[75] Inventor: Holger Hansen, Hamburg, Fed. Rep. of Germany

[73] Assignee: Autoflug GmbH, Rellingen, Fed. Rep. of Germany

[21] Appl. No.: 673,958

[22] Filed: Nov. 20, 1984

[30] Foreign Application Priority Data

Nov. 22, 1983 [DE] Fed. Rep. of Germany ....... 3342097

[51] Int. Cl.[4] .............................................. B64D 17/38

[52] U.S. Cl. .................................. 244/151 B; 441/95; 441/33; 441/96; 200/221; 200/61.04; 200/81 R

[58] Field of Search ....................... 244/151 A, 151 B; 200/DIG. 41, 187–190, 61.04, 81 R, 221, 228, 229; 324/439; 340/620; 441/33, 96, 95; 114/367

[56] References Cited

U.S. PATENT DOCUMENTS 2,254,710 9/1941 Reid .................................. 244/221

3,602,661 8/1971 Liedberg .......................... 200/61.05

3,774,870 11/1973 Sheffield et al. ................ 244/151 B 4,513,248 4/1985 Miller ............................. 244/151 B

*Primary Examiner*—Galen L. Barefoot

*Attorney, Agent, or Firm*—Townsend and Townsend

[57] ABSTRACT

The compressed-gas device for the life-saving services which can be activated by water, more especially the automatic separating coupling for parachutes, comprises a channel (9) and two detector chambers (10, 11) which, via openings (12, 13), are connected to the channel (9) and, via openings (14, 15), are connected to one respective opposite outer surface (16, 17) of the device. The cross-section of the outwardly directed openings (14, 15) is larger than that of the connection openings (12, 13) to the channel (9). Only when the measuring block (2) is completely immersed in water are three pairs of electrodes (18, 19; 20, 21; 22, 23) bridged by water so that a fuel-gas charge is ignited via an electric circuit (7) with the aid of an igniter (8) (FIG. 2).

9 Claims, 3 Drawing Figures

Fig.1
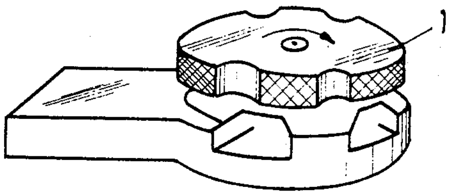
Fig.2
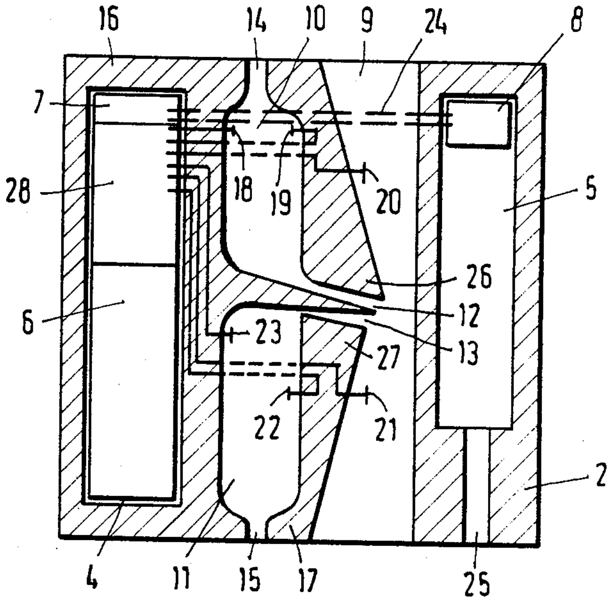
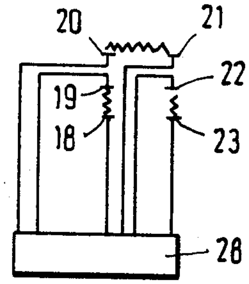
Fig.3

WATER ACTIVATED PRESSURIZED GAS APPARATUS FOR RESCUE APPLICATIONS

The invention relates to a compressed-gas device for the life-saving services which can be activated by water, more especially an automatic separating coupling for parachutes, and which is provided with a chamber, into which water can enter through openings, and which comprises electrodes, upon whose bridging with water the compressed gas is activated via an electric circuit.

In many cases, it is necessary for life-saving purposes to trigger a specific operation when contact with water is made. For example, a life raft, life jacket or the like is intended to be inflated when it has been thrown into the water. A life buoy is intended to be activated, for instance for the emission of light or radio signals, as soon as it floats in the water.

But for parachutists, too, special operations have to be initiated when the parachutist reaches the water. For if he is not released in time from his parachute by the actuation of a rapid-action coupling, then he can be pulled beneath the water by the parachute canopy which has not yet collapsed. In many cases, he will however be incapable of carrying out this separation in time, for example when he has fainted or is injured or subjected to shock.

In the case of the parachutist, in particular, it is however also essential that the operation to be triggered by water should not be initiated prematurely, for example by spray water, rain water, water of condensation or the like, since this would involve a high risk of fatal accidents.

It is indeed known to use a device of the kind mentioned at the beginning for the automatic inflation of life-saving equipment, more especially life jackets. The device comprises a chamber which is provided with two electrodes. If this chamber is gradually filled with water, then the electric resistance between the two electrodes is reduced. If this resistance drops below a specific previously selected value, then the desired operation (inflation of the life jacket) is initiated (DE PS No. 19 60 649).

The effectiveness of the device depends critically on the selection of the resistance value. If this value is set (e.g. for fresh water) to a relatively high value, then it may be that, owing to spraying processes or previous contamination, only a small quantity of salt water passes into the chamber before the device floats in the water, the operation being however triggered all the same. It is true that, in connection with life jackets, this will in many cases lead to less dramatic problems, but for a parachutist this would mean the premature release of the parachute and thus, in all probability, the death of the parachutist. If, on the other hand, the resistance value is set to a very small value, then it may be that in fresh water this value is not reached at all, even if the capsule is filled completely, so that the desired operation is not triggered once the capsule has been completely filled with water.

It is the object of the invention to provide a device of the kind mentioned at the beginning which causes the desired operation to be triggered reliably and only if the device is in the water.

The solution according to the invention consists in that the device comprises a channel which extends from a first surface of the device to a second opposite surface through the device, and in that it has a first detector chamber which is connected to the first surface by an opening and to the channel by another opening, and in that it comprises a second detector chamber which is arranged between the first detector chamber and the second surface and which is connected to the second surface by an opening and to the channel by another opening, the channel and each of the detector chambers containing two electrodes which can be bridged by water and which are so connected that the activation of the compressed gas is effected upon the bridging of all three pairs of electrodes.

Instead of one chamber, there are thus used a channel and two detector chambers which are each provided with two electrodes. As long as even one pair of electrodes is not bridged by a water path, the electric circuit measures a very high electric resistance and therefore does not initiate the desired operation (e.g. the release of the separating coupling). Only when all three chambers are filled, is the resistance suddenly reduced so that this abrupt change can be reliably detected and the desired operation can be reliably triggered. The essential advantage over the known arrangement (DE PS No. 19 60 649) is the fact that the lowering of the resistance is not gradually but suddenly effected with the filling. Therefore no critical setting of a threshold resistance for salt water or fresh water is necessary; the device works equally reliably both in salt water and in fresh water.

Furthermore, there is provided a considerably greater protection against spray water, rain water and the like since, even under extremely unfavourable circumstances, the channel and the two chambers connot be simultaneously filled with water as long as the device is not surrounded by water on all sides, that is to say lies or floats in the water.

If, for example, water flows from the top (on the first surface) on the device, then it can flow through the channel but cannot fill the channel. It would indeed be possible for water from the channel to penetrate through the other opening into the second detector chamber, but there it would flow more quickly from the first opening than it can flow in, since the other opening has a smaller cross-section than the first opening. It would only be possible for the first detector chamber to be filled if the flow velocity were correspondingly high or in the event of a heavy rainfall or the like condition. This would cause, at the outside, the first pair of electrodes in the first detector chamber but hardly the pair of electrodes in the channel (only if the flow velocities were very high) and on no account the pair of electrodes in the second detector chamber to be bridged so that the desired operation would not be triggered, for example the separating coupling of a parachute would not be actuated.

The same conditions exist if one turns the device upside down, in other words if the flow acts on the device from the second surface. In this case, too, the operation actuated by compressed gas is not initiated.

Only if the entire device is in the water does the channel fill relatively quickly with water and are the two detector chambers completely filled with water somewhat more slowly, so that all three pairs of electrodes are bridged by water and the operation actuated by compressed gas is triggered.

A particularly simple connection of the electrodes to the electric circuit is obtained if respectively one of the electrodes of the detector chambers is connected to the voltage source and/or the electric circuit and the respective other electrode is connected to one of the electrodes of the channel in an electro-conductive manner. In this way, the electrode paths in the two detector chambers and in the channel are connected in series. If only one pair of electrodes in the channel or the detector chambers is not bridged, the circuit measures a very high electric resistance, which is abruptly rendered very low if the last chamber is also filled with water. A bridging from one chamber to the other, without any complete filling of all the chambers, could take place at the outside, for example a bridging of the first and last electrodes by a water film which is disposed in the two detector chambers. Because of the relatively considerable length of the water path, this results however in a substantially higher resistance which, circuitwise, can be easily distinguished from a complete filling.

If the circuit is to be made even more reliable, so as to eliminate problems of this kind, too, then provision is advantageously made for each of the electrodes to be individually connected to the electric circuit. The circuit then measures the resistance between each pair of electrodes. Only if all three resistances thus measured have been reduced by bridging with water is the compressed gas activated.

Preferably, the device can also be actuated manually. This is aimed less at eliminating the disadvantage of a possible failure in the water than at providing the possibility of using the device on land, for example for a parachute jump onto firm ground.

If the cross-sectional area of the other opening in the detector chamber is considerably smaller than that of the channel, then the flow in the channel is affected to a relatively slight extent by the additional flows in/from the detector chambers, causing the functioning of the device to become even more reliable and more predictable.

The channel may be provided with a central contraction, an electrode being provided on each side of the contraction. This has the advantage that the channel cannot be completely filled with liquid even if rain or the like is applied thereto at a high flow velocity; on the contrary, that part of the channel which points away from the side on which the liquid impinges will remain empty to a greater or lesser degree, so that the electrodes cannot be bridged by the liquid.

The other openings of the detector chambers may be provided in the zone of the contraction which, in the event of heavy rain and a therefore unilaterally filled channel, does not result in the disadvantage that one measuring chamber can be filled from this side.

The contraction may be formed by a projection of the channel wall, to the sides of which projection the electrodes of the channel are fitted, rebounding behind the projection. By this means, the projection causes the water flow to be deflected from one of the electrodes in the event of heavy rain or other heavy water flows so that, here too, there cannot occur any bridging by water.

To ensure that spray water, water of condensation or the like easily flows away from the device and does not form any accumulations which might bridge the electrodes, provision may be advantageously made for the first and second surfaces and the surfaces of the channel and of the detector chambers to consist of polytetrafluoroethylene which is marketed under the designation "Teflon". Of course, the entire block in which the channel and the detector chambers are provided may consist of this material.

An advantageous constructional form is distinguished in that the electrodes are arranged in the shape of an $\pi$. Only when all three legs of the $\pi$ are covered by water, in other words if the entire block with the channel and the chambers lies in the water, can the desired operation be triggered.

The entire measuring element may be designed so as to be very small, for example in the size of a match box, so that it requires little space and nevertheless works reliably.

The invention will hereinafter be described with the aid of an advantageous constructional form and with reference to the accompanying drawings, in which:

FIG. 1 shows a view of a manually operable quick-action separating coupling for parachutes, in which the device according to the invention can be installed;

FIG. 2 shows a section through a substantial part of of the device according to the invention; and FIG. 3 shows a spatial $\pi$-shaped arrangement of the electrodes of the device according to the invention.

In FIG. 1 there is shown a quick-action separating coupling 1, in connection with which the device according to the invention can be advantageously used. However, other applications are possible, such as in automatically inflatable life jackets and the like.

As shown in FIG. 2, the device consists of a block 2 with two substantially closed cavities 4 and 5. In the cavity 4 there is arranged a battery 6 as well as an electronic circuit 7, 28 connected thereto. In the cavity 5 there is provided a fuel gas unit, of which only an electrically actuatable igniter 8 is shown. The block furthermore comprises a channel 9 which passes therethrough from top to bottom and which narrows in the centre. At the side of this channel 9 there are provided a first detector chamber 10 and a second detector chamber 11 which are connected to the channel 9, in the vicinity of its contraction, via openings 12 and 13 respectively. These openings have a relatively small cross-section. The detector chambers 10 and 11 are furthermore connected to the upper surface 16 and the lower surface 17 respectively of the block 2 via openings 14 and 15 respectively. The cross-section of the openings 14 and 15 is larger than that of the openings 12 and 13.

The detector chamber 10 comprises electrodes 18, 19, the channel 9 comprises electrodes 20, 21, and the detector chamber 11 comprises electrodes 22 and 23. Each of these electrodes is connected to the part 28 of the electric circuit, by means of which the resistances between the electrodes arranged in pairs in the detector chambers 10, 11 and in the channel 9 are measured.

The control circuit is so set that the ignition charge 8 is only ignited by the electric circuit 7 via lines 24 when all three pairs of electrodes in the two detector chambers and in the channel are bridged by water, causing the fuel gas to emerge from the block, from the chamber 5 via the channel 25, and at the desired point at which the separating coupling is to be actuated or else, for example, a life jacket is to be inflated. It is possible (but not absolutely necessary) to set the unit in such a way that it only reacts when it is filled with sea water, by which means one can of course even more reliably prevent it from being triggered by rain water and the like.

As one can readily discern from FIG. 2, the channel 9 cannot be completely filled with water on account of the contraction even if high flow velocities of water, which acts on the block 2 from the top, are involved; the lower part thereof will partly remain empty so that the electrodes 20, 21 cannot be bridged. This applies all the more because, due to the central contraction of the channel 9, the water is so deflected in the zone of the projections 26, 27 that it does not touch the lower electrode 21. The detector chamber 10 can be filled with water but not the detector chamber 11, since the cross-section of the inflow opening 13 is smaller than that of the compensating opening 15. The same applies of course if the flow comes from the other side or the block 2 is turned upside down.

FIG. 3 illustrates the $\pi$-shaped arrangement of the electrodes 18 to 23, the water paths located therebetween being indicated by wavy lines.

I claim:

1. A compressed-gas device for the life-saving services which can be activated by water, more especially an automatic separating coupling for parachutes, and which is provided with a chamber, into which water can enter through openings, and which comprises electrodes, upon whose bridging with water the compressed gas is activated via an electric circuit, characterised in that it comprises a channel (9) which extends from a first surface (16) of the device to a second opposite surface (17) through the device, and in that it comprises a first detector chamber (10) which is connected to the first surface (16) by an opening (14) and to the channel (9) by another opening (12), and in that it comprises a second detector chamber (11) which is arranged between the first detector chamber (10) and the second surface (17) and which is connected to the second surface (17) by an opening (15) and to the channel (9) by another opening (13), the channel (9) and each of the detector chambers (10, 11) containing two electrodes (18, 19; 20, 21; 22, 23) which can be bridged by water and which are so connected that the activation of the compressed gas is effected upon the bridging of all three pairs of electrodes.

2. A device as claimed in claim 1, characterized in that there is connected in an electroconductive manner respectively one of the electrodes (18, 23) of the detector chambers (10, 11) to a voltage source (6) or the electric circuit (7, 28) and the respective other electrodes (19, 22) to the corresponding electrodes (20, 21) of the channel (9).

3. A device as claimed in claim 1, characterised in that each of the electrodes (18, 19; 20, 21; 22, 23) is individually connected to the electric circuit (7, 28).

4. A device as claimed in claim 1, characterised in that the device can be actuated manually.

5. A device as claimed in claim 1, characterised in that the cross-sectional area of the other openings (12, 13) of the detector chambers (10, 11) is substantially smaller than that of the channel (9).

6. A device as claimed in claim 1, characterised in that the channel (9) is provided with a central contraction (26, 27), the channel electrodes (20, 21) being provided on each side of the contraction (26, 27).

7. A device as claimed in claim 6, characterised in that the other openings (12, 13) of the detector chambers (10, 11) are provided in the zone of the contraction (26, 27).

8. A device as claimed in claim 6, characterised in that the contraction (26, 27) is formed by a projection of the channel wall, to the sides of which projection the electrodes (20, 21) of the channel (9) are fitted, rebounding behind the projection (26, 27).

9. A device as claimed in claim 1, characterised in that the first and second surfaces (16, 17) and the surfaces of the channel (9) and of the detector chambers (10, 11) consist of polytetrafluoroethylene.

* * * * *